US007180906B1

United States Patent
Dwork

(10) Patent No.: US 7,180,906 B1
(45) Date of Patent: Feb. 20, 2007

(54) METHOD AND APPARATUS FOR AUTOPOLLING PHYSICAL LAYER DEVICES IN A NETWORK

(75) Inventor: Jeffrey Dwork, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/505,062

(22) Filed: Feb. 16, 2000

Related U.S. Application Data

(60) Provisional application No. 60/171,484, filed on Dec. 22, 1999.

(51) Int. Cl.
*H04L 12/42* (2006.01)
(52) U.S. Cl. .......................................... 370/449; 710/46
(58) Field of Classification Search ................ 370/422, 370/423, 465, 469, 449, 451, 445, 446, 454, 370/461, 462, 463
See application file for complete search history.

(56) References Cited

U.S. PATENT DOCUMENTS 4,751,630 A * 6/1988 Kelley et al. ................ 709/231

* cited by examiner

*Primary Examiner*—Doris H. To
*Assistant Examiner*—Thien D. Tran

(57) ABSTRACT

A method and apparatus for autopolling physical layer (PHY) devices in a network is controlled by information contained in a plurality of poll registers. A user independently defines the PHY addresses and register numbers for a plurality of external PHY registers and provides these to the poll registers. In each poll register, an enable bit is provided for each of the selected PHY registers. When a host CPU sets one of the enable bits, the poll logic reads the corresponding PHY register and stores the result in a corresponding poll data register. One poll data register is provided for each poll register. Thereafter, at each polling interval, the poll logic compares the current contents of the selected PHY register with the contents of the corresponding poll data register. If a change is detected, an interrupt is set in an interrupt register, which causes an interrupt to the host CPU.

19 Claims, 3 Drawing Sheets

METHOD AND APPARATUS FOR AUTOPOLLING PHYSICAL LAYER DEVICES IN A NETWORK

RELATED APPLICATIONS

This application contains subject matter related to the subject matter disclosed in copending U.S. Provisional Patent Application Ser. No. 60/171,484, filed on Dec. 22, 1999.

FIELD OF THE INVENTION

The present invention relates to the field of network communications, and more particularly, to the monitoring of status information that resides within the physical layer devices of a network.

BACKGROUND OF THE INVENTION

Conventional local area network architectures use network interface devices containing media access controller operating according to half-duplex or full-duplex Ethernet (ANSI/IEEE Standard 802.3) protocols, such as 10BASE-T or 100BASE-TX: The physical layer tranceiver (PHY) attached to the media access controller (MAC) at one end of the network medium communicates with the PHY at the other end of the medium to negotiate the link capabilities, such as speed and duplex mode, and status (link up or down).

Correct operation of the network requires that the controller be informed of the link status and capabilities. Newer operating systems require the network interface controller to autonomously determine the link status, without assistance of software. Consequently, the controller contains hardware that reads and writes the necessary registers in the PHY to determine the link status and capabilities.

Recent extensions of the 802.3 standard and related standards allow ethernet MAC's to be used with PHYs that communicated over other media, such as conventional in-home telephone wires or via radio. Telephone line and wireless media characteristics can change rapidly over time. These changes are sensed by the PHY and the current status stored in registers with the PHY. In some cases, these changes require the MAC or host software to change operating modes. The interface between the PHY to signal that a change has occurred. Therefore, it is necessary for the associated PHY registers to be frequently polled by the controller. Other extensions of the 802.3 standard add new capabilities, such as the "pause ability". Information about these capabilities is stored in new PHY registers or in previously unused bits in existing PHY registers.

It is not possible to anticipate all possible extensions of the standard when a particular network interface controller is designed, nor is it always practical to include all the necessary polling hardware to cover all possible applications of the controller. Any necessary polling not done by the controller hardware must be done by host software. This software polling increases the size and complexity of the software. In addition, it imposes a burden on the host processor. In other words, the host processor has to devote valuable resources to check relying on software to obtain this other information is the overhead associated with the host processor obtaining the information. In other words, the host processor has to devote valuable resources to check on this other information, even if it is not changed, instead of devoting its resources to other tasks. Since the information may not change between instances where the software is checking on the network conditions, this process is extremely wasteful.

SUMMARY OF THE INVENTION

There is a need for an automatic polling mechanism to obtain network information from PHY layer devices in a network, in addition to link status information, without incurring additional software overhead.

This and other needs are met by the present invention which provides an arrangement for Th polling external physical layer device (PHY) registers in a network. The arrangement includes a number (n) of poll registers that store information indicating which PHY registers are to be polled. The arrangement includes a number (m) of poll data registers that receives polled information from the PHY registers. Poll logic automatically polls those PHY registers indicated by the information in the poll registers as PHY registers to be polled, and also stores the polled information in the PHY registers.

Some of the advantages achieved by the present invention include the ability to obtain information automatically through polling logic. The use of a number of poll registers and poll data registers allows any number of different registers of different PHY devices to be polled. The information that is obtained in these different PHY registers is stored in the corresponding poll data registers. By proper programming of the poll registers, the PHY registers to be polled are selected and automatically polled. Software does not need to be used to obtain this information, which may be other than link status information, and so PHY registers that may be polled are selectable by the user.

The earlier stated needs are also met by an embodiment of the present invention which provides a method of automatically polling physical layer device (PHY) registers of a network. The method includes storing addresses of a subset of PHY registers and a plurality of PHY registers. The PHY registers whose addresses are stored are periodically polled. The polling results are stored and compared with previous polling results. An interrupt signal is generated when the polling results are different from the previous polling results.

One of the advantages of the method of the present invention is the generation of an interrupt signal when the polling results indicate that the conditions in the network have changed. Interrupts of the processor need not be generated unless the network conditions change. This reduces the overhead required of the processor and allows it to devote its resources to other processing tasks.

The foregoing and other features, aspects and advantages of the present invention will become more apparent in the following detailed description of the present invention when taken in conjunction with the accompanying drawings.

DETAILED DESCRIPTION OF THE INVENTION

The present invention addresses and resolves the problems associated with software overhead in determining network conditions from the information contained in the registers of the PHY devices. This is accomplished through autopoll registers that contain the register numbers and addresses of the PHY registers to be polled. Autopoll logic examines the autopoll registers to determine whether autopolling is enabled for a particular register. If autopolling is enabled, then the PHY register is automatically polled and the value is posted in corresponding autopoll data registers in the network interface device. When changes are detected from the results of previous polling, then an interrupt is generated to inform the host CPU that the network conditions have changed. Software overhead to determine these network conditions is thereby avoided through the automatic polling logic and registers.

Figure 1:
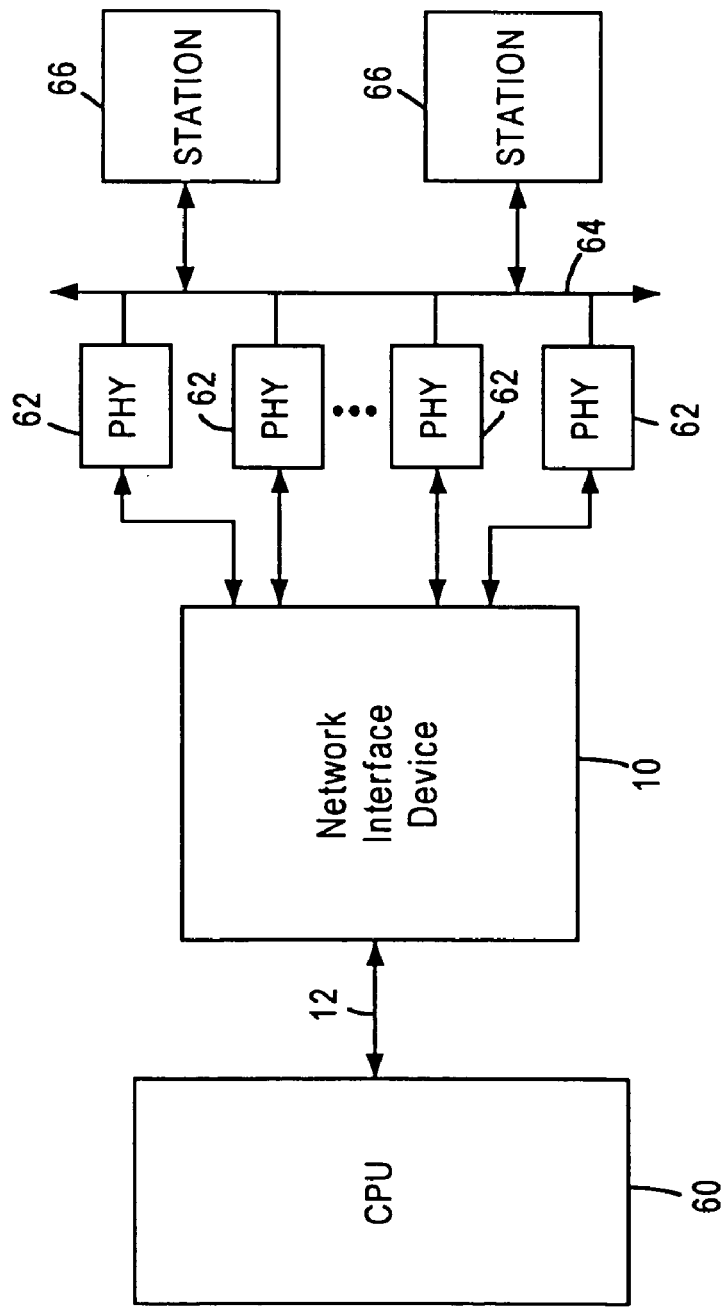
FIG. 1 is a block diagram of a network arrangement in accordance with embodiments of the present invention.

FIG. 1 is a block diagram showing an arrangement in accordance with an embodiment of the present invention. The arrangement includes a network interface device 10 which is coupled through a system bus 12 to host TPU 60.

The network interface controller 10 interfaces, through a media independent interface (MII), not shown in FIG. 1, to a plurality of PHY devices 62. Each PHY device 62 is coupled to a medium 64. Examples of mediums include twisted wire pair, CAT-V cabling, etc. Other stations 66 can be connected to the medium 64. The PHY layer devices 62 may also connect into a single common medium 64.

As defined in the IEEE 802.3 standard, the external PHY attached to the network interface device's immediate independent interface has no way of communicating important timely status information back to the network interface device. Unless it polls the external PHY's status register, the network interface device has no way of knowing the external PHY has undergone a change in status. Although it is possible for the host CPU to poll the registers in the external PHY devices, the network interface device 10 in the present invention simplifies this process by implementing an automatic polling function that periodically polls user-selected PHY registers and interrupts the host CPU 60 if the contents of any of these registers change.

Before describing the automatic polling function and automatic polling logic of the present invention, another view of the network interface device 10 will be provided.

The present invention is described in the context of an IEEE 802.3 compliant network interface configured for sending and receiving data packets between a system memory and a network medium using established Media Access Control (MAC) and Physical Layer (PHY) protocols. An overview will first be provided of the network interface, followed by a description of the arrangement for autopolling the PHY devices.

Figure 2:
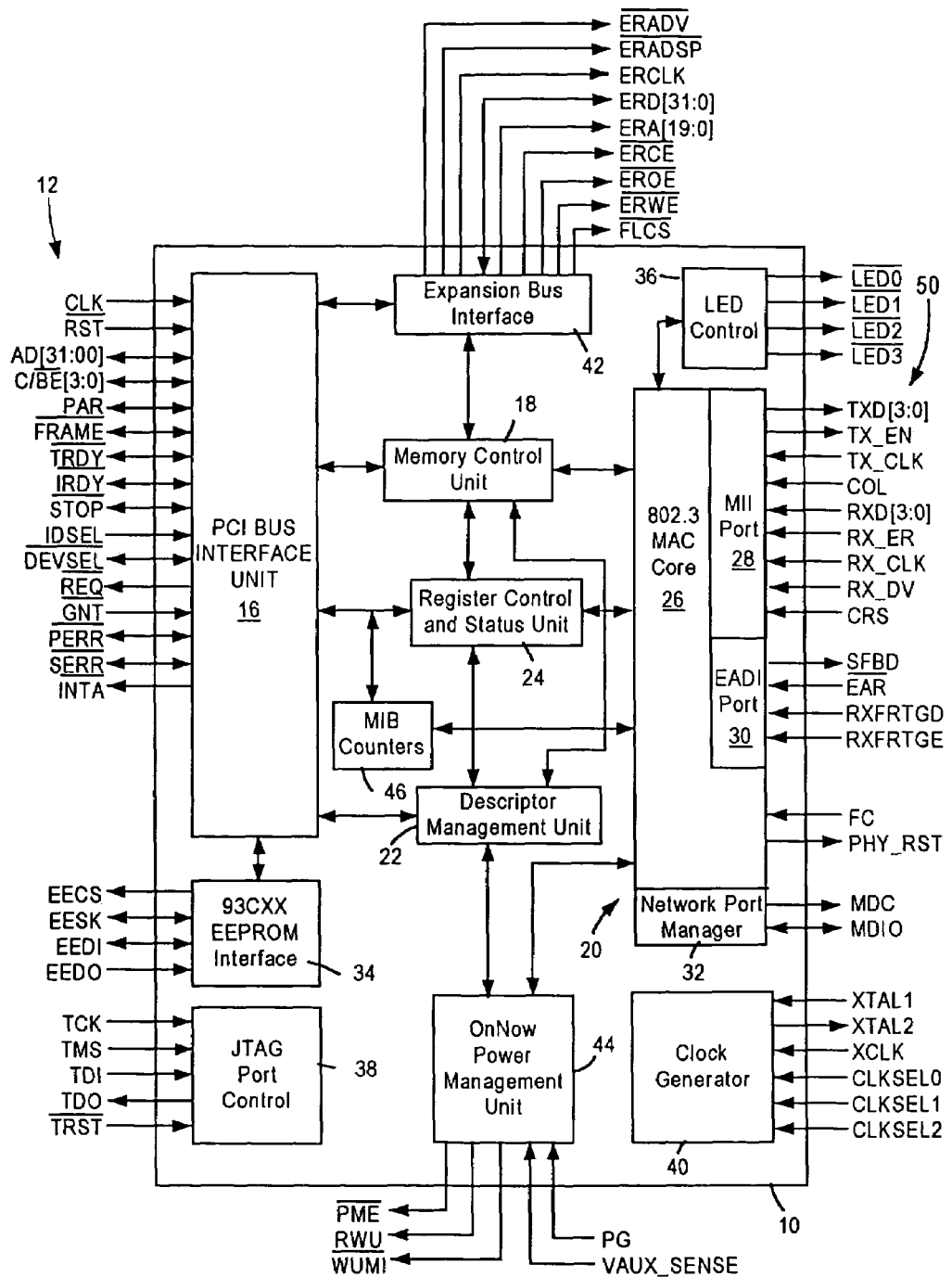
FIG. 2 is a block diagram of a network interface device constructed in accordance with an embodiment of the present invention.

FIG. 2 is a block diagram of an exemplary network interface 10 that accesses the media of an Ethernet network according to an embodiment of the present invention.

The network interface 10, preferably a single-chip, 32-bit Ethernet controller, provides an interface between a local bus 12 of a computer, for example, a peripheral component interconnect (PCI) local bus, and an Ethernet-based media 50. The reference numeral 50 identifies either an actual network medium, or alternately a signal path (e.g., a media independent interface (MII)) to a physical layer transceiver coupled to the network media.

The network interface 10 includes a PCI bus interface unit 16, a memory control unit 18, a network interface portion 20, a descriptor management unit 22 and a register control and status unit 24. The network interface portion 20 includes an IEEE 802.3 compliant and full-duplex capable media access control (MAC) core 26, a Media Independent Interface (MII) port 28 for connecting external 10 Mb/s, 100 Mb/s or 1000 Mb/s transceivers, an External Address Detection Interface (EADI) port 30, and a network port manager unit 32, The network interface 10 also includes an EEPROM interface 34 for reading from and writing to an external EEPROM, an LED control 36, an IEEE 1149.1-compliant JTAG Boundary Scan test access port interface 38, a clock generation unit 40, and an expansion bus interface 42. The expansion bus interface unit 42 interfaces to an external or internal data memory (not shown in FIG. 1) for frame storage and also to non-volatile (e.g., EPROM or Flash memory) storage for boot ROM use during startup.

The PCI bus interface unit 16, compliant with the PCI local bus specification (revision 2.2), receives data frames from a host computer memory via the PCI bus 12. The PCI bus interface unit 16, under the control of the descriptor management unit 22, receives transfers from the host computer via the PCI bus 12. For example, transmit data received from the PCI bus interface unit 16 is passed to the memory control unit 18 which stores it in the data memory. Subsequently, the memory control unit 18 retrieves the transmit data from the data memory and passes it to the MAC 26 for eventual transmission to the network. Similarly, receive data from the network 50 is processed by the MAC 26 and passed to the memory control unit 18 for storage in the data memory. Subsequently, the memory control unit IS retrieves the receive data from the data memory and passes it to the PCI bus interface unit 16 for transfer to the host computer via the PCI bus 12.

The descriptor management unit 22 manages the transfers of data to and from the host computer via the PCI bus interface unit 16. Data structures contained in the memory of the host computer specify the size and location of data buffers along with various control and status information. The descriptor management unit 22 interfaces with the memory control unit 18 to insert control information into the transmit data stream and to retrieve status information from the receive data stream.

The network interface portion 20 includes a network port manager 32 that performs auto-negotiation functions by communicating via the media 50 with a corresponding auto-negotiation unit in the link partner (e.g., a centralized hub, repeater, workstation, or switch).

The network interface 10 also includes a power management unit 44 that enables remote activation (i.e., turn-on) of the host computer via the network medium 50 by detecting a predetermined pattern on the network medium 50 according to Microsoft OnNow and ACPI specifications, including compliance with Magic Packet technology and PCI Bus Power Management Interface Specification protocols.

The network interface 10 also includes a MIB counter unit 46 which accepts information from the MAC 26 regarding frame transmission and reception and maintains the statistics necessary for network management. These statistics are accessed by the host computer via the PCI bus interface unit 16.

Figure 3:
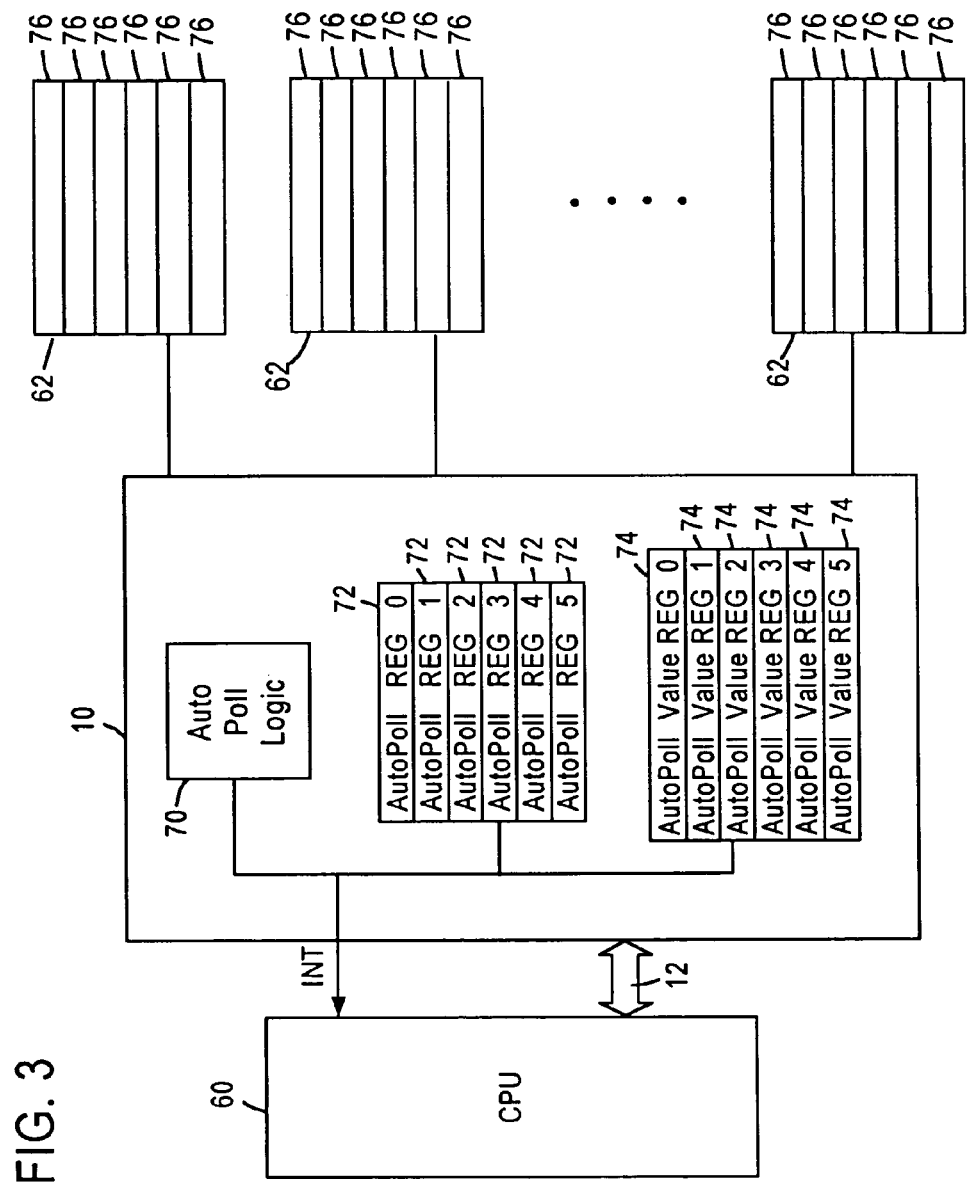
FIG. 3 is a block diagram depicting in more detail autopoll logic and registers of the network interface device of FIG. 2, constructed in accordance with an embodiment of the present invention.

FIG. 3 depicts a schematic block diagram of the autopolling logic and the associated autopolling registers, along with the PHY devices 62, in accordance with embodiments of the present invention.

The MAC core 26 includes autopoll logic 70 which implements the automatic polling function of the present invention. The autopoll logic 70 operates in conjunction with poll registers 72 and poll data registers 74. In the exemplary embodiment of the invention, the number (n) of poll registers is 6, and the number (m) of poll data registers is also 6. There is a 1-to-I correspondence between the number of poll registers 72 and poll data registers 74. A greater number or a lesser number of poll registers and poll data registers may be employed depending upon the desired number of PHY registers to be polled.

The automatic polling of the PHY registers 76 contained in the PHY devices 62 is controlled by the information contained in the six poll registers 72. In certain embodiments of the invention, the poll registers 72 are 16-bit registers. By writing to the poll register 72, a user independently defines the PHY addresses and register numbers for six external PHY registers 76. As apparent from the block diagram of FIG. 3, the external PHY registers 76 are not restricted to a single PHY device 62. The poll registers 72 contain fields that control the automatic polling formed by the autopoll logic 70. The fields for a typical poll register 72 are provided below.

| BIT | NAME | DESCRIPTION |
|---|---|---|
| 15 | AP_REG1_EN | Enable Bit for Autopoll Register 1. When this bit and the Autopoll External PHY bit (APEP) in CMD1 are both set to 1, the Autopoll State Machine periodically reads the external PHY register selected by the AP_PHY1_ADDR and AP_REG1_ADDR fields and sets the APINT1 interrupt bit if it detects a change in the register's contents. |
| 14–13 | RES | Reserved locations. Written as zeros and read as undefined. |
| 12–8 | AP_REG1_ADDR | AP_REG1 Address. This field contains the register number of an external PHY register that the Autopoll State Machine will periodically read if the AP_REG1_EN bit in this register and the APEP bit (CMD3, bit 24) set. |
| 7 | RES | Reserved location. Written as zero and read as undefined. |
| 6 | AP_PRE_SUP1 | Autopoll Preamble Suppression. If this bit is set to 1, the Autopoll State Machine will suppress the preambles of the MII Management Frames that it uses to periodically read the external PHY register selected by the AP_PHY1_ADDR and AP_REG1_ADDR fields. This bit is ignored when the AP_PHY1_DFLT bit is set. |
| 5 | AP-PHY1-DFLT | Autopoll PHY1 Default. When this bit is set, the Autopoll State Machine ignores the contents of the AP_PHY1_ADDR and AP_PRE_SUP1 fields and uses the AP_PHY0_ADDR field for the address of the PHY device to be polled. If this bit is set, the Autopoll State Machine will suppress preambles only if the Port Manager has determined that the default external PHY can accept MII Management Frames without preambles. (The Port Manager examines bit 6 in register 1 of the default PHY to make this determination. |
| 4–0 | AP_PHY1_ADDR | Autopoll PHY1 Address. This field contains the address of the external PHY that contains AP_REG1. This bit is ignored when the AP-PHY1-DFLT bit is set. |

The first field (AP_REG1_EN) is an enable comprising a single enable bit for the poll register 72. When this bit is set and the autopolling enable bit (controls the autopoll logic 70) is set, the autopoll logic 70 (its state machine) periodically reads the external PHY register 76 as determined by the address and register number information contained in the poll register 72 fields.

The second field (bits 14-13) is a reserved field.

A third field, bits 12-8, is a register address field that contains the register number of an external PHY register 76 that the polling logic 70 will periodically read (assuming that the enable bit is set in the enable field and the autopolling enable bit is also set).

Bit 7 is a reserved field.

Bit 6 forms the preamble suppression field. If this bit is set to 1, the autopolling logic 70 suppresses preambles of MII management frames used to periodically read the external PHY register that is identified in the enable field and the address field of the poll register 72. The preamble suppression bit is ignored when the default bit, explained below, is set.

Bit 5 is a default field. When the bit in this field is set, the poll logic 70 ignores the contents of the address field and preamble suppression fields and uses a default address for the address of the PHY device to be polled. If this bit is set, the autopoll state machine will suppress preambles only if a network port manager (32 in FIG. 1) has determined that the default external PHY can accept MII management frames without preambles. The port manager 32 examines bit 6 and register 1 of the default PHY register to make this determination. The default PHY register will be explained in more detail later.

The final field in the poll register 72 is made up of bits 4-0 and is the address field that contains n the address of the external PHY which contains the register identified in the register field of the poll register 72. This field is ignored when the default bit is set in the default field of register 72.

One of the poll registers 72 differs from the remaining poll registers 72 in several ways. The PHY address field of this poll register 72 defines the default PHY address that is used by the autopoll logic 70 in the network port manager 32. The register number field is fixed at 1 (which corresponds to the external PHY status register), and the register is always enabled. This means that if the poll logic 70 is enabled (by autopolling enable bit), the poll logic 70 will always poll register 1 of the default PHY 62 and will interrupt the host CPU 60 when a change is detected in that register.

If the preamble suppression bit is set in the preamble suppression field, the polling logic 70 sends management frames to the corresponding register with no preamble field. The host CPU 60 should only set the preamble suppression bit poll registers in PHY devices that are known to be able to accept management frames without preambles. For PHY devices that comply with clause 22 IEEE STD 802.3, bit 6 of PHY register 1 is fixed at 1 if the PHY will accept management frames with the preamble suppression.

If the default PHY bit is set in a default PHY field, the corresponding preamble suppression bit and PHY address field are ignored. In this case the poll logic 70 uses the default PHY address from the address field of the autopoll register 72 which contains the default PHY address, and suppresses the preamble if the network port manager logic 32 has determined that the default PHY device accepts management frames with no preamble. If the network port manager logic 32 has not determined that the default PHY device accepts management frames with no preamble, the poll logic 70 does not suppress the preamble when accessing the selected register.

The poll logic 70, as discussed before, is enabled when an autopoll external PHY enable bit (found in the command bits accessible by the host CPU 60) is set to 1. If the autopoll external PHY enable bit is cleared to 0, the poll logic 70 does not poll any PHY registers regardless of the state of the enable bits in the poll registers 72. The autopolling enable bit has no effect on the network port manager 32, which may poll the default PHY 62 even when the state of the autopolling enable bit is 0.

Assuming that the autopolling enable bit is set to allow autopolling of the poll logic 70, and that the enable bit is set in the enable field of a poll register 72, the poll logic 70 reads the corresponding PHY register indicated by the register number field and the PHY address field in the poll register 72. The results of the polling of the register 76 are stored in a corresponding poll data register 74. In certain embodiments of the invention, the poll data register 74 is a 16-bit register. Comparison logic within the poll logic 70 compares the current contents of the selected PHY register 76 with the contents of the poll data register 74. (These contents are the previously polled information from the PHY register) 76. If the comparison logic detects a change, the poll logic 70 sets the corresponding autopoll interrupt (AP_INT0 through AP_INTn) in the interrupt register. The setting of the interrupt in the interrupt register causes an interrupt to the host CPU 60, assuming that interrupt is enabled. Assuming that the contents of one of the selected PHY registers 76 is changed, the corresponding poll data register 74 is updated so that another interrupt will occur when the data changes yet again.

In certain embodiments of the invention, when the host CPU 60 writes to one of the poll registers 72, the contents of the associated poll data register 74 are considered by the poll logic 70 to be invalid during the next polling cycle so that the poll data register 74 is updated during the next polling cycle without causing an interrupt to be generated.

The present invention provides an autopolling mechanism that reduces the overhead for a host CPU to obtain information regarding a plurality of network conditions. This is performed in an efficient manner with polling logic, poll registers and poll data registers.

Although the present invention has been described and illustrated in detailed, this is to be clearly understood that the same is by way in illustration and example only and is not to be taken by way of limitation, the scope of the present invention being limited only by the terms of the appended claims.

What is claimed is:

1. An arrangement for polling external physical layer device (PHY) registers in a network, comprising:
    a number (n) of poll registers that store information indicating which PHY registers are to be polled;
    a number (m) of poll data registers that receive polled information from the PHY registers; and
    poll logic that automatically polls those PHY registers indicated by the information in the poll registers as PHY registers to be polled, and stores the polled information in the PHY registers.

2. The arrangement of claim 1, wherein the poll logic includes comparison logic that compares currently polled information with previously polled information stored in the poll data registers.

3. The arrangement of claim 2, wherein the poll logic includes write logic responsive to the comparison logic to replace the previously polled information stored in the poll data registers with the currently polled information when the currently polled information is different than the previously polled information.

4. The arrangement of claim 3, wherein the poll logic includes interrupt generation logic responsive to the comparison logic to generate an interrupt signal when the currently polled information is different than the previously polled information.

5. The arrangement of claim 1, wherein n=m.

6. The arrangement of claim 1, wherein each of the poll registers includes an address field that contains an address of a PHY containing a PHY register to be polled.

7. The arrangement of claim 6, wherein each of the poll registers includes a register number field that contains the register number of the PHY register to be polled of the PHY indicated by the address contained in the address field.

8. The arrangement of claim 7, wherein each of the poll registers includes an enable field that enables and disables automatic polling of the PHY register to be polled.

9. The arrangement of claim 8, where, in one of the poll registers, the enable field is always set to enable automatic polling, the register number is set to the status register of the PHY, and the address field contains the address of a default PHY.

10. The arrangement of claim 9, wherein each of the poll registers includes a preamble suppression field that contain information which determines whether the poll logic is to send management frames to the PHY registers without preambles.

11. The arrangement of claim 10, wherein each of the poll registers includes a default field that contains information which determines whether the address in the address field is to be used or the address of the default PHY is to be used to determine the PHY register to be polled.

12. The arrangement of claim 11, wherein the poll logic is configured to suppress a preamble when the default PHY accepts management frames with no preamble.

13. A method of automatically polling physical layer device (PHY) registers of a network, comprising the steps of:
    storing addresses of a subset of PHY registers from a plurality of PHY registers; periodically polling the PHY registers whose addresses are stored;
    storing polling results obtained by the periodically polling;
    comparing the polling results with previous polling results; and
    generating an interrupt signal when the polling results are different from the previous polling results.

14. The method of claim 13, wherein the addresses of the PHY registers are stored in poll registers.

15. The method of claim 14, wherein the polling results are stored in poll data registers.

16. The method of claim 15, further comprising enabling and disabling the periodic polling by setting and clearing an enable field in the poll registers.

17. The method of claim 16, further comprising setting the enable field of one of the poll registers to permanently enable periodic polling, and storing the address of a status register of a default PHY in an address field of that poll register.

18. The method of claim 17, further comprising sending management frames without preambles to PHY registers in dependence on the setting of a preamble suppression field in the poll registers.

19. The method of claim 18, further comprising setting a default field in the poll registers to control whether the address stored in the poll register is to be used as the address of the default PHY when a PHY register is polled.

* * * * *